United States Patent [19]

Ueno

[11] Patent Number: 5,015,105
[45] Date of Patent: May 14, 1991

[54] CROWN-SHAPED CAGE FOR A RADIAL BEARING

[75] Inventor: Hiroshi Ueno, Osaka, Japan

[73] Assignee: Koyo Seiko Co., Ltd., Osaka, Japan

[21] Appl. No.: 497,076

[22] Filed: Mar. 21, 1990

[30] Foreign Application Priority Data

Apr. 7, 1989 [JP] Japan ................ 1-41434[U]

[51] Int. Cl.⁵ .................. F16C 33/41; F16C 33/44
[52] U.S. Cl. ............................. 384/531; 384/526
[58] Field of Search ........................... 384/523–534

[56] References Cited

U.S. PATENT DOCUMENTS 4,040,687  8/1977  Rogers.
4,702,627  10/1987  Pollastro ................ 384/531 X

FOREIGN PATENT DOCUMENTS 0193058  9/1986  European Pat. Off.
53-7177   2/1978  Japan.
58-170423 11/1983  Japan.
256186   11/1926  United Kingdom ............ 384/531
1594582   7/1981  United Kingdom ............ 384/526

Primary Examiner—Thomas R. Hannon
Attorney, Agent, or Firm—Wenderoth, Lind & Ponack

[57] ABSTRACT

A crown-shaped cage for a radial bearing has a plurality of pockets for receiving balls. The pockets, which have their respective entrances axially on one side of the cage, are spaced from each other at regular intervals in a circumferential direction by partition walls. Each of the partition walls has engagement portions in an inside part thereof at positions opposite the pockets on both sides thereof, the engagement portions on both sides of each of the pockets being to be engaged with each ball so as to stop the ball in radial and axial directions. In each of the partition walls is provided a relief space for allowing deflection caused in the partition walls when the ball is inserted in the pocket. The crown-shaped cage can be made of even a plastic material such as PPS, PEEK or the like which offers excellent heat resistant but low flexibility, due to the presence of the relief space and the engagement portions provided in the inside part of the partition walls.

7 Claims, 3 Drawing Sheets

CROWN-SHAPED CAGE FOR A RADIAL BEARING

BACKGROUND OF THE INVENTION

The present invention relates to a crown-shaped cage which is used, for example, in a deep groove ball bearing, and particularly to a crown-shaped cage which is able to positively hold balls inserted easily in its pockets using the elasticity of its component material, and can, particularly, have the balls inserted in the pockets even when it is made of a material with nominal flexibility.

When made of plastics, bearing cages can be made lightweight and can be manufactured using monolithic molding processes offering higher mass productivity, and the flexibility of the plastics can be used for press insertion of each ball in the respective pockets. For these reasons, plastics are widely used for crown-shaped cages. Among these, nylon is widely used as plastic material mainly because it provides sufficient flexibility to cages.

However, demand has risen in recent years for bearings which can be used in high temperature environments, resulting directly in growing demand for cages with high heat resistance. Various plastics with higher heat resistance than nylon, including polyphenylene sulfide (hereinafter referred to as PPS), polyether ether ketone (hereinafter referred to as PEEK), and other plastics with resistance to heat of 200° C. or more, have therefore been tested recently for their suitability as a material for crown-shaped cages. PPS and PEEK, however, are less flexible than nylon.

A conventional crown-shaped cage has multiple pockets that are open on both ends in the radial direction and open on one side in the axial direction. Each of the entrances to the pockets, which are open in the axial direction as described above, is smaller in width in the circumferential direction than the diameter of each ball by a given dimension. Insertion of a ball into its pocket is performed by pressing the ball from the entrance in the axial direction, flexibly forcing the walls, which are on both sides of the entrance to form the pocket, out in the circumferential direction. After the ball is completely inserted, the entrance returns to the original width, thereby holding the inserted ball in the axial direction. When all balls are inserted in such a way in their respective pockets the balls are held at specified regular intervals in the circumferential direction.

Since the construction of the conventional crown-shaped cage as described above is such that walls on both sides of an entrance are simply spread flexibly in the circumferential direction when a ball is inserted in the axial direction into the cage, the entire walls must give or deflect flexibly when the pocket is opened. When the cage is constructed of nylon or a similar flexible material, the walls can be elastically deformed in the circumferential direction to expand the entrance to the diameter of the ball so that the ball can be inserted. However, when the cage is made from PPS or PEEK, materials with excellent heat resistance but much less flexibility, the entrance cannot be spread to the diameter of the ball and it is therefore not possible to insert the ball into the pocket.

SUMMARY OF THE INVENTION

Therefore, the object of the present invention is to provide a crown-shaped cage which assures an elastic and easy insertion of balls into pockets even when the cage is made of a plastic material with high temperature resistance but nominal flexibility such as PPS, PEEK or the like, in order to make it possible to use a bearing with the cage made of such plastics under a high temperature condition.

In order to achieve the above object, a crown-shaped cage for a radial bearing of the present invention has partition walls for forming a plurality of pockets for accommodating balls, said pockets being spaced from each other at regular intervals in a circumferential direction, and respective entrances of the pockets for the balls being provided axially on one side of the cage. Each of said partition walls has engagement portions in an inside part thereof at positions opposite the pockets on both sides thereof. The engagement portions on both sides of each of the pockets are to be engaged with each ball so as to stop the ball in radial and axial directions. There are provided relief spaces in the partition walls for allowing deflection caused in the partition walls when the balls are inserted in the pockets.

The crown-shaped cage according to the present invention operates as follows.

This crown-shaped cage is used in a radial bearing. Paying attention to a single ball, the engagement portions provided on both sides of the inside part of a pocket stops the ball in the radial and axial directions. Thus, when all balls are disposed between the races of inner and outer rings and are held in the respective pockets of the cage, the crown-shaped cage is stopped against the balls in the radial and axial directions by the engagement portions, and is supported in the radial and axial directions by the balls at a specified gap on inside and outside rings of the bearing in the radial direction. The balls inserted into the pockets are also held at regular intervals in the circumferential direction in such a way that they can turn.

The balls are inserted in the axial direction into the pockets through the pocket entrances which open elastically. When the balls are relatively inserted in the axial direction, the engagement portions spread elastically to the diameter of the balls. In addition to the presence of the relief space for allowing the deflection caused in the partition wall when the balls are inserted, the engagement portions are provided in the inside part of the partition walls facing the pocket. As such, instead of expanding by moving only in the circumferential direction as occurs with a conventional cage, the walls of the crown-shaped cage of the present invention are able to expand with compound movement in the circumferential and radial directions. Thus, even when the crown-shaped cage is manufactured from a plastic material such as PPS, PEEK, polysulfone, polyether sulfone, polyether imide, polyamide imide or the like which offers excellent heat resistance but low flexibility and therefore does not permit insertion of a ball into a pocket in a conventional crown-shaped cage, easy insertion of balls into the pockets is realized by easily and flexibly expanding the walls, which include the engagement portions, to the ball diameter. After the ball is once inserted into the pocket, the elastically restored engagement portions stops the ball in the axial direction, and thus positively prevents the ball from escaping.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
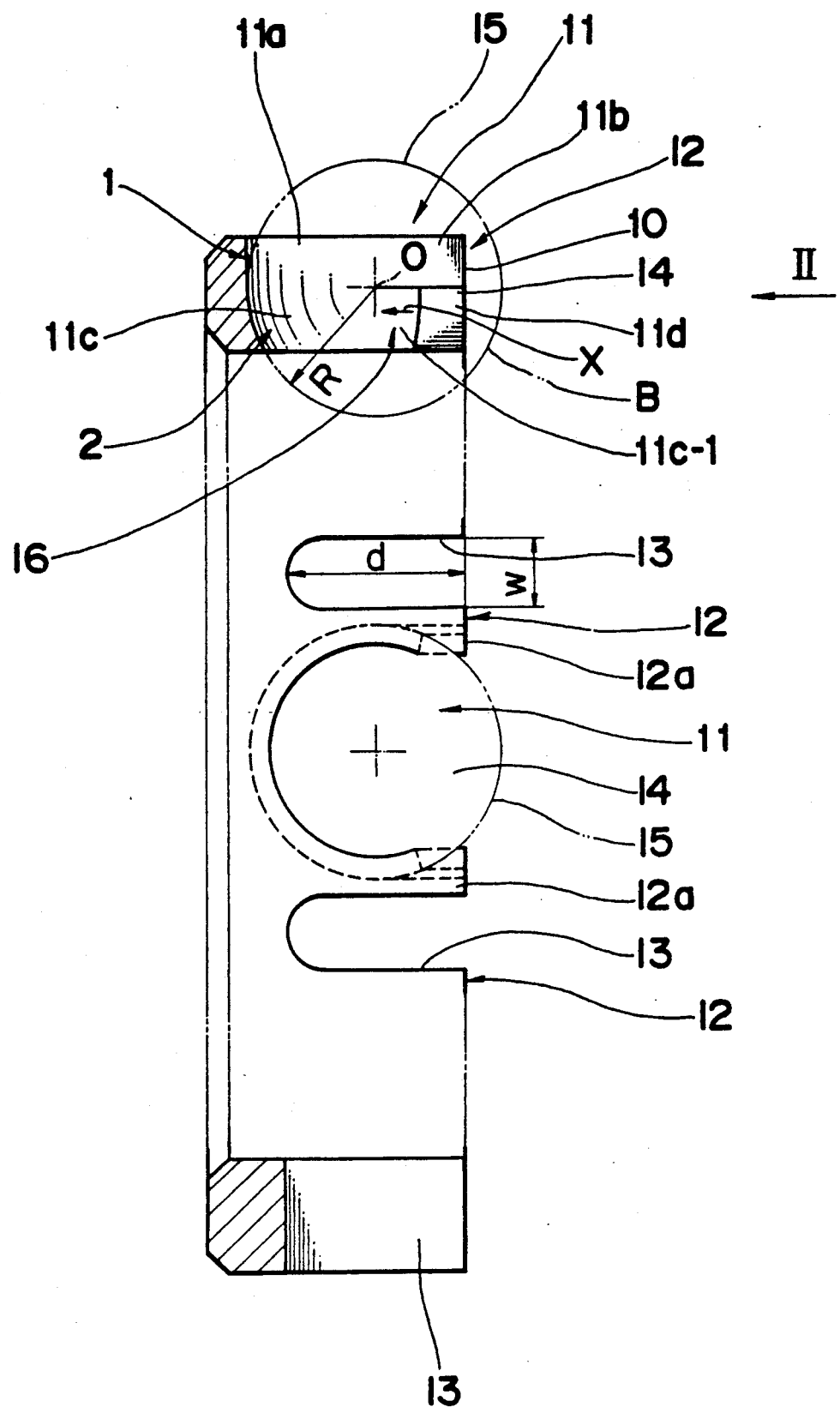
FIG. 1 is a cross sectional view in the axial direction of an embodiment of a crown-shaped cage according to the present invention.
Figure 2:
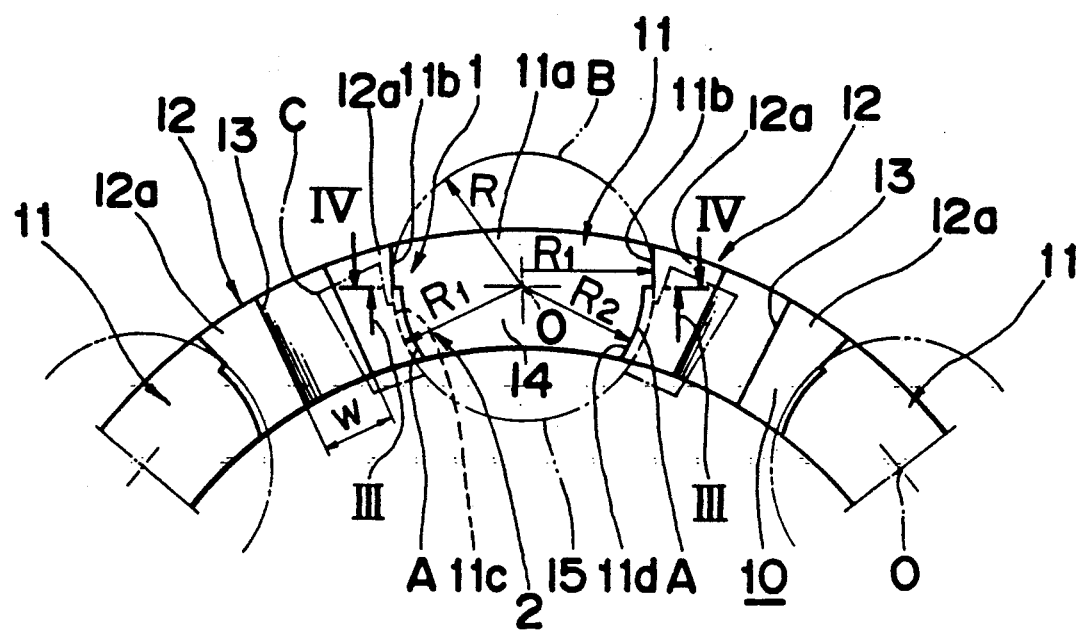
FIG. 2 is a view taken in the direction of the arrow II in FIG. 1.

FIG. 1 shows a cross sectional view of a crown-shaped cage according to the present invention. This crown-shaped cage is made of plastics such as PPS, PEEK, polysulfone, polyether sulfone, polyether imide, polyamide imide, or the like, each of which has resistance to heat of 200° C. or more. This cage is provided with a plurality of pockets 11 at regular intervals in the circumferential direction. Each of the pockets 11 is open on both ends in the radial direction and is open on one side 10 in the axial direction, thus forming a pocket entrance. As shown in FIGS. 1 and 2, recesses 13, which are open on both ends in the radial direction and are open on the one side 10, are provided at approximately the center of partition walls 12 between the pockets 11 in the circumferential direction. The recesses 13 have a depth d in the axial direction approximately equal to the depth of the pockets 11 from the one side 10, and a width w in the circumferential direction. As shown in FIG. 2, the partition walls 12 are divided in the circumferential direction into two approximately equal cantilever-shaped portions 12a forming a tuning fork shape by the recesses 13. The recesses 13 provide relief spaces for flexible expansion or deflection of the cantilever-shaped portions 12a when balls are inserted into the pockets 11 as will be described hereinbelow.

Figure 3:
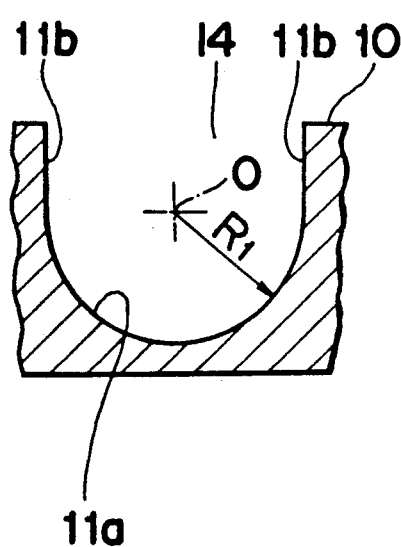
FIGS. 3 and 4 are cross sectional views taken on the section line of FIG. 2 in the directions of the arrows III—III and IV—IV, respectively.
Figure 4:
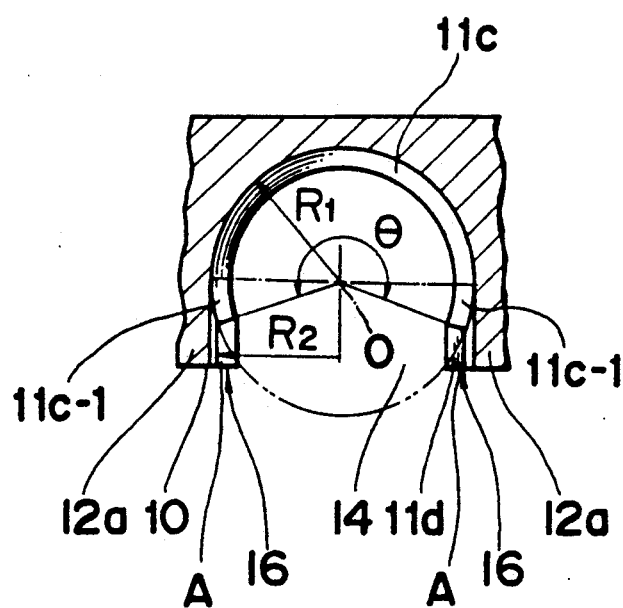

As shown in FIGS. 2, 3 and 4, each pocket 11 consists of two parts: an outside part 1 and an inside part 2. As shown in FIGS. 2 and 3, the outside part 1 of each pocket 11 is defined by a cylindrical surface 11a extending in the radial direction of the cage and a pair of planes 11b continued from the cylindrical surface 11a in the axial direction so as to form a U-shape surface together with the cylindrical surface 11a. The cylindrical surface 11a has a radius of R1 from the center 0 of the pocket 11, and the planes 11b are parallel to the axial direction and separated by a distance 2R1.

On the other hand, as shown in FIGS. 2 and 4, the inside part 2 of each pocket 11 is formed by spherical surface 11c with a radius R1 from the center 0 of the pocket 11, and by cylindrical surfaces 11d extending in the axial direction with a radius R2, the axis of which passes the center 0 of the pocket 11.

Regarding the inside part 2 of the pocket 11, the radius R1 of the spherical surface 11c is slightly larger than the radius R of a ball 15 indicated by a dotted line B as shown in FIG. 2. Furthermore, the radius R2 (see FIG. 2) of the cylindrical surface 11d extending in the axial direction is a given dimension smaller than the radius R of the ball 15. Thus, because the radius R2 of the cylindrical surfaces 11d forming an entrance 14 to the pocket 11 in the inside part 2 is smaller than the radius R1 of the spherical surface 11c, the angle formed between ends of the spherical surface 11c shown in FIG. 4 as θ is greater than 180°. Parts, indicated by A, A in FIGS. 2 and 4, between end portions 11c-1 of the spherical surface 11c, which are the portions over 180°, and the end surfaces 10 opposite the portions 11c-1 in the axial direction form claw-shaped engagement portions 16. The engagement between these engagement portions 16 and the balls 15 holds the balls to the cage, and at the same time holds the cage to the balls, in both the axial and radial directions, as described hereinafter.

When the balls 15 are fit between the races of inner and outer rings (not shown in the figures) and held in the pockets 11 as shown by the dotted line B in FIG. 1, the crown-shaped cage stops the balls 15 in the axial direction by the portions 11c-1 of the spherical surfaces 11c. In other words, the cage is stopped in the axial direction by the engagement between the portions 11c-1 and the balls 15 and thus supported in the axial direction. The balls 15 are prevented from slipping out in the axial direction from the respective entrances of the pockets 11 by the engagement in the axial direction, shown by an arrow X in FIG. 1, with the portions 11c-1 of the spherical surfaces 11c which exceed 180° (see FIG. 4). At the same time, the crown-shaped cage is prevented from being disconnected from the balls 15 and slipping off in the axial direction by that engagement. While the crown-shaped cage is thus held in the axial direction, it is also held in the radial direction to the balls 15 by the spherical surfaces 11c and supported in the radial direction by the balls 15. The crown-shaped cage is thus positioned with a given gap relative to the inner and outer rings.

In the crown-shaped cage as thus described, when a ball 15 is inserted in the axial direction into a pocket 11, the pair of cantilever-shaped portions 12a provided on both sides in the circumferential direction of the entrance 14 to the pocket 11 are pressed by the ball 15, and the engagement portions 16 are expanded elastically to a point enabling the passage of the ball 15. Because the recesses 13 are provided in the partition walls 12 on both sides of the pocket in this crown-shaped cage, it is not the whole of the partition walls 12 but only part of the partition walls 12, specifically the cantilever-shaped portions 12a that flex.

The depth d and width w of the recesses 13 are determined to be of appropriate dimensions with consideration given to the flexibility of the material of the cage, and the flexibility of the portions 12a is adjusted to an appropriate amount as required for the insertion of the balls 15. The recesses 13 serve as relief spaces into which the cantilever-shaped portions 12a can give. As described above, the engagement portions 16 are provided in the inside part, and the cantilever-shaped portions 12a move with a compound action of flexure in the circumferential and radial directions instead of spreading with movement only in the circumferential direction as occurs with the partition walls of a conventional cage, and are thus able to expand by a greater amount (see a dotted line C in FIG. 2). Thus, the cantilever-shaped portions 12a and engagement portions 16 in this crown-shaped cage can easily and smoothly deflect elastically to a position enabling passage of the ball 15 though the crown-shaped cage made of PPS or PEEK, materials with flexibility so small that insertion of the ball into the pocket would not be possible with a crown-shaped cage of conventional construction. Therefore, the ball 15 can be flexibly inserted into the pocket 11 with ease.

The crown-shaped cage into which insertion of all balls 15 to the pockets 11 has been completed is held in the axial direction as shown by the arrow in FIG. 1 to each ball 15 by the engagement portions 16 of the cantilever-shaped portions 12a of the partition walls 12 which have elastically recovered to their original positions, and removal of the cage is positively prevented. The crown-shaped cage holds the balls 15 inserted in the pockets 11 at regular intervals in the circumferential direction such that the balls 15 can rotate smoothly.

It is to be noted that because the cantilever-shaped portions 12a on both sides of the pockets 11 are able to easily expand with compound movement in the circumferential and radial directions as described above, it is possible to remove this crown-shaped cage from a mold by removing cores in a die corresponding to the recesses 13 and the pockets 11 successively in the axial direction, and the cage can thus be manufactured by monolithic molding. In addition, the cage can also be monolithically molded by removing the cores for the recesses 13 in the axial direction, and those for the pockets 11 in the radial direction.

Thus, because the crown-shaped cage has recesses 13 in the partition walls 12, the flexibility of the cantilever-shaped portions 12a can be adjusted by appropriately selecting the shape and dimensions (depth d, width w) of the recesses 13 according to the flexibility of the material, and these recesses 13 can be used as the relief area for the expansion of the portions 12a when the balls 15 are inserted. In addition, because the engagement portions 16 which stop against the ball 15 in the axial direction and the radial direction are provided on the inside diameter side of the cantilever-shaped portions 12a, when the ball is inserted in the axial direction into the pocket 11, the cantilever-shaped portions 12a on both sides of the pocket 11 can be expanded flexibly with a compound movement in both the circumferential and radial directions instead of only in the circumferential direction as do the partition walls in a conventional crown-shaped cage. Therefore, even if the crown-shaped cage is manufactured from PPS, PEEK, or a similar material such as polysulfone, polyether sulfone, polyether imide, or polyamide imide with excellent high temperature resistance but small flexibility, the engagement portions 16 can easily expand to a position enabling passage of the ball 15, and the ball 15 can be easily and positively inserted into the pocket 11. Therefore, using this crown-shaped cage, a high temperature resistant, and therefore, a high speed ball bearing can be achieved.

Figure 5:
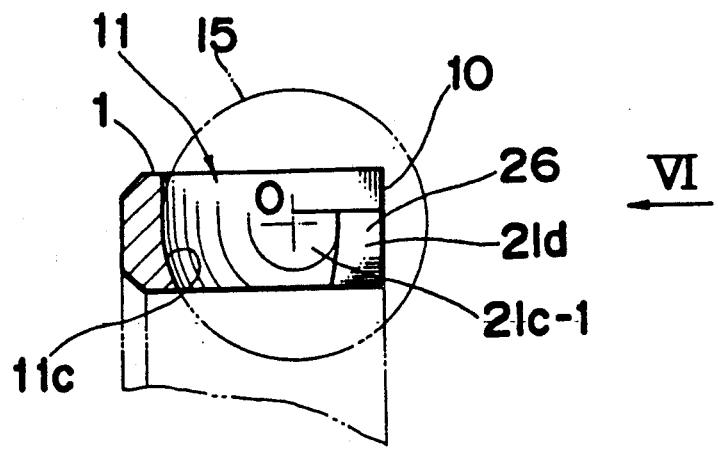
FIG. 5 is a cross sectional view in the axial direction of another embodiment.

FIGS. 5, 6, 7 and 8 show a modification of the engagement portions 16 of the above-described embodiment. Other parts than the engagement portions are designated by the same reference numerals as in the above embodiment and description of those same parts will be omitted. FIGS. 5, 6, 7 and 8 correspond to FIGS. 1, 2, 3, and 4, respectively, though FIG. 5 shows the essential section only.

Figure 6:
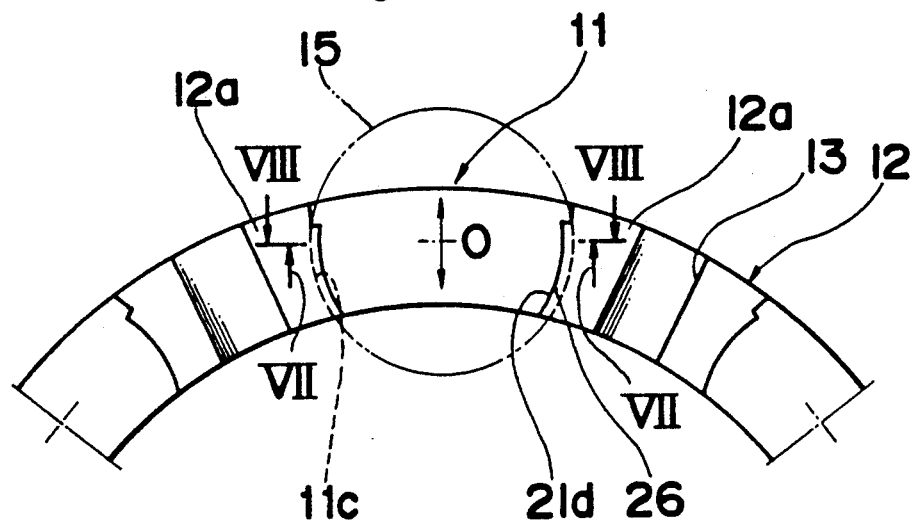
FIG. 6 is a view taken in the direction of the arrow VI in FIG. 5
Figure 7:
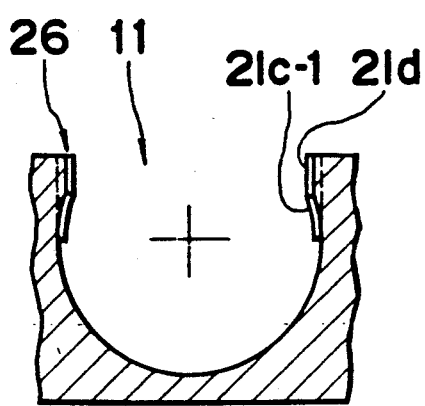
FIGS. 7 and 8 are sectional views taken in the section line of FIG. 6 in the directions of the arrows VII—VII and VIII—VIII, respectively.
Figure 8:
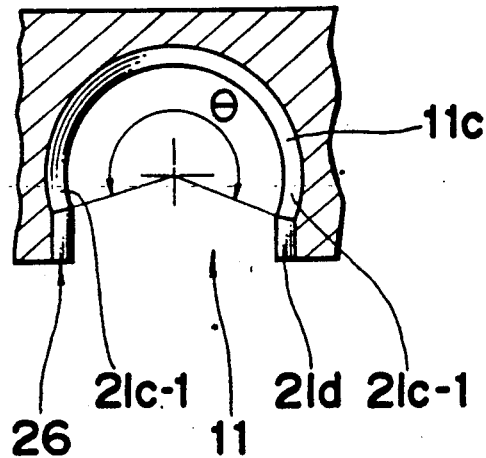

According to the modification shown in FIGS. 5, 6, 7 and 8, engagement portions 26 of the partition walls 11 are defined by end portions 21c-1 over 180° of the spherical surface 11c and cylindrical surfaces 21d, wherein both the end portions 21c-1 and the cylindrical surfaces 21d, and therefore the engagement portions 26 extend more outwardly in the radial direction than the center 0 of the pocket, as shown in FIGS. 6 and 7. This offers an advantage that the ball 15 is prevented from slipping off radially outwardly, in addition to the advantages of the above embodiment. As a result, escape of the ball 15 from the pocket 11 both in radial directions (indicated by arrows in FIG. 6) and in the axial direction is prevented. This is a very advantageous feature when balls 15 are inserted into the pockets 11 of the cage in advance prior to the assemblage into a bearing, because the balls 15 do not slip off the pockets in any direction.

The engagement portions are not limited in their construction to those defined by the spherical and cylindrical surfaces as described above, but may have any shape which similarly holds the ball in the axial and radial directions. The material of the crown-shaped cage shall, of course, also not be restricted to the plastic materials recited above.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crown-shaped annular cage for a radial bearing, comprising:

partition walls spaced circumferentially at regular intervals around said cage and defining between adjacent partition walls a plurality of pockets for accomodating balls, said pockets being spaced from each other at regular intervals in the circumferential direction of said said cage, said pockets extending radially through said cage and having entrances opening axially of said annular cage on one side of said cage;

said partition walls on opposite sides of each pocket having engagement portions projecting into the pocket at the radially inner portion of the axially open entrance of the pocket, the engagement portions on both sides of each pocket being engagable with a ball in the pocket so as to prevent escape of the ball from the pocket in radial and axial directions; and said partition walls having relief spaces therein at positions between said pockets for allowing deflection of the partition walls when balls are inserted in the pockets.

2. The cage as claimed in claim 1, which is made of plastics with high temperature resistance.

3. The cage as claimed in claim 2, which is made of polyphenylene sulfide.

4. The cage as claimed in claim 2, which is made of polyether ether ketone.

5. The cage as claimed in claim 1, wherein each of the partition walls has two cantilever-shaped portions with the relief space interposed therebetween, the relief space being a recess open on opposite ends in the radial direction of said cage and open on said one side of the cage, each pocket having an outside part which is substantially of a U-shape and defined by a cylindrical surface formed around an axis along the center of the pocket in a radial direction and a pair of planes extending from each end of the cylindrical surface in parallel with the axial direction of the cage, and said pockets each having a radially inner part of the pocket defined by a spherical surface formed around the center of the pocket and a cylindrical surface formed around an axis extending through the center of the pocket in the axial direction of said cage, the radius of the cylindrical surface of the inside part being smaller than the radius of the spherical surface, the two ends of the spherical surface being positioned closer to the entrance of the pocket than at imaginary plane containing the center of the pocket and rectangularly intersecting the axial direction, said cylindrical surface of the inside part and the two end portions of the spherical surface which are past the imaginary plane toward the entrance of the pocket constituting said engagement portions.

6. The cage as claimed in claim 5, which is made of plastics with high temperature resistance.

7. The cage as claimed in claim 5, wherein the two end portions of the spherical surface and the cylindrical surfaces of the inside part of the pocket extends outwardly in the radial direction past the center of the pocket whereby the engagement portions extend outwardly in the radial direction past the center of the pocket.

* * * * *